United States Patent
Schwefer et al.

(10) Patent No.: US 10,899,617 B2
(45) Date of Patent: Jan. 26, 2021

(54) METHOD FOR REMOVING $N_2O$ AND $NO_x$ FROM THE NITRIC ACID PRODUCTION PROCESS, AND AN INSTALLATION SUITABLE FOR SAME

(71) Applicant: ThyssenKrupp Uhde GmbH, Dortmund (DE)

(72) Inventors: Meinhard Schwefer, Meschede (DE); Rolf Siefert, Rheda-Wiedenbrück (DE); Jürgen Fuchs, Dortmund (DE); Klaus Ruthardt, Dortmund (DE); Michael Groves, Gevelsberg (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 307 days.

(21) Appl. No.: 15/667,293

(22) Filed: Aug. 2, 2017

(65) Prior Publication Data
US 2017/0334722 A1 Nov. 23, 2017

Related U.S. Application Data

(62) Division of application No. 13/984,921, filed as application No. PCT/EP2012/000642 on Feb. 14, 2012, now Pat. No. 9,738,521.

(30) Foreign Application Priority Data

Feb. 21, 2011 (DE) .................. 10 2011 011 881
Feb. 14, 2012 (WO) ............... PCT/EP2012/000642

(51) Int. Cl.
| | |
|---|---|
| *B01D 53/86* | (2006.01) |
| *C01B 21/40* | (2006.01) |
| *C01B 21/26* | (2006.01) |
| *C01B 21/38* | (2006.01) |
| *B01J 29/072* | (2006.01) |
| *B01J 29/46* | (2006.01) |
| *B01J 29/68* | (2006.01) |
| *B01J 29/76* | (2006.01) |

(52) U.S. Cl.
CPC ............ *C01B 21/40* (2013.01); *B01D 53/869* (2013.01); *B01D 53/8628* (2013.01); *B01J 29/072* (2013.01); *C01B 21/265* (2013.01); *C01B 21/38* (2013.01); *B01D 2255/2065* (2013.01); *B01D 2255/20738* (2013.01); *B01D 2255/20746* (2013.01); *B01D 2255/20761* (2013.01); *B01D 2255/502* (2013.01); *B01D 2255/504* (2013.01); *B01D 2257/402* (2013.01); *B01D 2257/404* (2013.01); *B01J 29/46* (2013.01); *B01J 29/68* (2013.01); *B01J 29/7615* (2013.01); *B01J 2229/42* (2013.01); *Y02C 20/10* (2013.01); *Y02P 20/151* (2015.11)

(58) Field of Classification Search
None
See application file for complete search history.

(56) References Cited

U.S. PATENT DOCUMENTS

| | | |
|---|---|---|
| 5,582,810 A | 12/1996 | Tretjak |
| 6,221,324 B1 | 4/2001 | Coq et al. |
| 6,890,501 B2 | 5/2005 | Delahay et al. |
| 7,485,276 B2 | 2/2009 | Schwefer et al. |
| 7,744,839 B2 | 6/2010 | Schwefer et al. |
| 7,906,091 B2 | 3/2011 | Schwefer et al. |

(Continued)

FOREIGN PATENT DOCUMENTS

| | | |
|---|---|---|
| CL | 200300655 | 12/2003 |
| CL | 200601117 | 1/2007 |

(Continued)

OTHER PUBLICATIONS

M. Schwefer, R. Maurer, M. Groves, "Reduction of Nitrous Oxide Emissions from Nitric Acid Plants" Nitrogen 2000 International Conference & Exhibition, Vienna, Austria, Mar. 12-14, 2000, pp. 61-81, Preprints, British Sulphur Publishing, London, UK.

Janssen, F. J., "Environmental Catalysis—Stationary Sources", Handbook of Heterogeneous Catalysis (eds G. Ertl, H. Knözinger and J. Weitkamp), 1997, pp. 1633-1668, vol. 4, VCH Verlagsgesellschaft mbH, Weinheim, Germany.

N. Gunasekaran S. Rajadurai and J.J. Carberry, "Catalytic decomposition of nitrous oxide over perovskite type solid oxide solutions and supported noble metal catalysts", Catalysis Letters, 1995, pp. 373-382, vol. 35, Issue 3-4, J.C. Baltzer AG, Science Publishers.

M. Rauscher, K. Kesore, R. Mönnig, W. Schwieger, A. Tißler, T. Turek, "Preparation of highly active Fe-ZSM-5 catalyst through solid-state ion exchange for the catalytic decomposition of N2O", Applied Catalysis A: General, 1999, 249-256, vol. 184, Issue 2, Elsevier Science B.V.

J. Pérez-Ramírez, F. Kapteijn, K. Schöffel, J.A. Moulijn, "Formation and control of N2O in nitric acid production: Where do we stand today?", Applied Catalysis B: Environmental, 2003, pp. 117-151, vol. 44, Issue 2, Elsevier Science B.V.

J. Pérez-Ramírez, F. Kapteijn, Guido Mul, X. Xu, J.A. Moulijn, "Ex-framework FeZSM-5 for control of N2O in tail-gases", Catalysis Today, 2002, pp. 55-74, vol. 76, Issue 1, Elsevier Science B.V.

(Continued)

*Primary Examiner* — Jelitza M Perez
(74) *Attorney, Agent, or Firm* — Michael W. Ferrell; Ferrells, PLLC; Anna L. Kinney

(57) ABSTRACT

An apparatus is provided for treatment of process gas formed during nitric acid production by catalytic oxidation of $NH_3$. The apparatus includes a reactor, a first catalyst bed for $N_2O$ decomposition, an absorption tower to react the $NO_x$ formed with an absorption medium downstream of the first catalyst bed, a device for adding $NH_3$ added to tailgas entering the second catalyst bed, and a second catalyst bed for $NO_x$ reduction and further decrease in $N_2O$ in the tailgas exiting the absorption tower. The second catalyst bed contains at least one iron-loaded zeolite catalyst. $N_2O$ removal in the first catalyst bed is limited such that the process gas exiting the first catalyst bed exhibits a $N_2O$ content of >100 ppmv and a molar $N_2O/NO_x$ ratio of >0.25. Treated gas exiting the second catalyst bed has a $NO_x$ concentration of <40 ppmv and a $N_2O$ concentration of <200 ppmv.

11 Claims, No Drawings

(56) References Cited

U.S. PATENT DOCUMENTS

| | | | |
|---|---|---|---|
| 2003/0143142 A1* | 7/2003 | Schwefer | C01B 21/265 423/239.2 |
| 2004/0023796 A1 | 2/2004 | Nirisen et al. | |
| 2004/0105803 A1 | 6/2004 | Schwefer et al. | |
| 2004/0110627 A1 | 6/2004 | Schwefer et al. | |
| 2005/0244320 A1 | 11/2005 | Schwefer et al. | |
| 2008/0241034 A1 | 10/2008 | Schwefer et al. | |
| 2010/0209325 A1 | 8/2010 | Schwefer et al. | |
| 2012/0034148 A1 | 2/2012 | Schwefer et al. | |

FOREIGN PATENT DOCUMENTS

| | | |
|---|---|---|
| CL | 200802400 A1 | 12/2008 |
| CL | 201101311 A1 | 10/2011 |
| CN | 1395502 A | 2/2003 |
| DE | 1984895 U | 5/1968 |
| DE | 10112396 A1 | 10/2002 |
| DE | 10112444 A1 | 10/2002 |
| DE | 10215605 A1 | 10/2003 |
| DE | 10001540 B4 | 6/2005 |
| DE | 10350819 A1 | 6/2005 |
| DE | 102007038711 A1 | 2/2009 |
| EP | 0955080 A1 | 11/1999 |
| EP | 1301275 A1 | 4/2003 |
| EP | 1918016 A1 | 5/2008 |
| EP | 2184105 A1 | 5/2010 |
| KR | 20020081252 A | 10/2002 |
| KR | 1020080011188 A | 1/2008 |
| WO | 2002002230 A1 | 1/2001 |
| WO | 2001051182 A1 | 7/2001 |
| WO | 2001051415 A1 | 7/2001 |
| WO | 2002005954 A1 | 1/2002 |
| WO | 2003084646 A1 | 10/2003 |
| WO | 2006119870 A1 | 11/2006 |
| WO | 2009021586 A1 | 2/2009 |
| WO | 2010063448 A1 | 6/2010 |

OTHER PUBLICATIONS

M.A.G. Hevia, J. Pérez-Ramírez, "Assessment of the low-temperature EnviNOx® variant for catalytic N2O abatement over steam-activated FeZSM-5", Applied Catalysis B: Environmental, 2008, pp. 248-254, vol. 77, Issues 3-4, Elsevier B.V.

M. Groves, A. Sasonow, "Uhde EnviNOx® Technology for NOx and N2O abatement—A contribution to reducing emissions from nitric acid plants", presentation at Fifth International Symposium on Non-CO2 Greenhouse Gases (NCGG-5), Wageningen, Netherlands, Jun. 30, 2009-Jul. 3, 2009, pp. 1-14.

Groves, Rieck, Remarks and Comments on Nitric Acid Production Project Protocol—Public Draft Version 1.0, Oct. 2009, issued by Climate Action Reserve.

International Search Report (from parent application, i.e., U.S. Appl. No. 13/984,921, now U.S. Pat. No. 9,738,521) dated Jun. 4, 2012.

Written Opinion (from parent application, i.e., U.S. Appl. No. 13/984,921, now U.S. Pat. No. 9,738,521) dated Jun. 4, 2012.

International Preliminary Report on Patentability (from parent application, i.e., U.S. Appl. No. 13/984,921, now U.S. Pat. No. 9,738,521) dated Aug. 21, 2013.

* cited by examiner

METHOD FOR REMOVING N$_2$O AND NO$_x$ FROM THE NITRIC ACID PRODUCTION PROCESS, AND AN INSTALLATION SUITABLE FOR SAME

CLAIM FOR PRIORITY

This application is a divisional application of U.S. application Ser. No. 13/984,921, filed Sep. 3, 2013. U.S. application Ser. No. 13/984,921 is a national phase application of PCT/EP2012/000642 filed Feb. 14, 2012 which was based on application DE 10 2011 011 881.0 filed Feb. 21, 2011. The priorities of U.S. application Ser. No. 13/984,921, PCT/EP2012/000642, and DE 10 2011 011 881.0 are hereby claimed and their disclosures incorporated herein by reference.

TECHNICAL FIELD

The invention relates to a method of removing N$_2$O and NO$_x$ from the process for nitric acid production and also a suitable plant for carrying out this process.

BACKGROUND

The production of nitric acid is, on an industrial scale, generally carried out by the Ostwald process by catalytic oxidation of ammonia (NH$_3$) over Pt/Rh catalysts. Here, NH$_3$ is selectively oxidized to nitrogen monoxide (NO) which is then oxidized during the course of the further process to nitrogen dioxide (NO$_2$) and finally reacted with water in an absorption tower to form nitric acid. The Pt/Rh catalysts are configured as thin gauzes clamped on a wide area in a burner. A gas mixture composed of typically about 8-12% by volume of ammonia and air is passed through the gauzes, with a temperature of about 850-950° C. being established at the gauzes due to the exothermic nature of the reaction.

An overview of the procedure for nitric acid production and its various process variants is given, for example, in Ullmans Encyclopedia of Industrial Chemistry, Vol. A 17, VCH Weinheim (1991) or in Winnacker-Küchler, Chemische Technik, Prozesse and Produkte, 5$^{th}$ edition, volume 3, Anorganische Grundstoffe, Zwischenprodukte, Chemische Technik, Dittmeyer, R./Keim, W./Kreysa, G./Oberholz, A. (editors), Wiley-VCH, Weinheim, (2005).

Unfortunately, however, the oxidation of NH$_3$ to NO is not 100% selective but a certain proportion of nitrogen (N$_2$) and nitrous oxide (N$_2$O) is always also formed in addition to the desired NO.

Depending on the oxidation conditions, i.e. prevailing pressure, temperature and inflow velocity to the NH$_3$ combustion and also type and state of ageing of the Pt/Rh gauze catalysts, about 4-15 kg of N$_2$O are typically formed per metric ton of HNO$_3$. This results in typical N$_2$O concentrations of from about 500 to 2000 ppmv in the process gas.

The N$_2$O formed is not absorbed when the process gas is fed into the absorption tower and thus goes into the tailgas of HNO$_3$ production. Since the deNO$_x$ stages installed here for reducing the residual content of NO and NO$_2$ (together referred to as NO$_x$) also generally do not bring about a reduction in the N$_2$O content, the N$_2$O finally goes more or less undiminished into the atmosphere. For example, the tailgas from a nitric acid plant in which the oxidation of NH$_3$ is carried out at intermediate pressure (about 4-5 bar abs) contains on average about 1000 ppmv of N$_2$O, which corresponds to an N$_2$O concentration in the process gas downstream of the NH$_3$ oxidation of about 830 ppmv.

While NO and NO$_2$ have long been known as compounds having ecotoxic relevance (acid rain, smog formation) and limit values for NO$_x$ emissions and technical measures for reducing their amounts have become established worldwide, nitrous oxide has become a focus of environmental concern only in the last decade since it contributes to a not inconsiderable extent to the degradation of stratospheric ozone and to the greenhouse effect. A variety of solutions for removing N$_2$O, partly in combination with new processes for NO$_x$ reduction have therefore been developed in recent years for the nitric acid process and employed in industrial plants for the production of nitric acid.

An overview of various measures for reducing the amounts of N$_2$O and NO$_x$ in the HNO$_3$ process is given, for example, in: J. Perez-Ramirez et al., "Formation and control of N$_2$O in nitric acid production—Where do we stand today?" Appl. Catal. B Environmental 2003, 44 (2), 117-151, in M. Schwefer, R. Maurer, M. Groves, "Reduction of Nitrous Oxide Emissions from Nitric Acid Plants" Nitrogen 2000 International Conference, Vienna, Austria, March 2000, or in Integrated Pollution Prevention and Control Reference Document on Best Available Techniques for the Manufacture of Large Volume Inorganic Chemicals—Ammonia, Acids and Fertilisers, European Commission August 2007.

For the removal of N$_2$O alone, secondary measures which are directed at decomposition of N$_2$O in the process gas of HNO$_3$ production are frequently used. Here, specific catalysts are installed directly downstream of the NH$_3$ combustion underneath the Pt/Rh gauze catalysts. The process gas here has temperatures of about 900° C., so that N$_2$O here requires only a little catalytic activation to decompose it. The aim of a secondary measure is to achieve very high degrees of removal of N$_2$O. An N$_2$O removal of >80%, often even >90%, is typically achieved. At an average amount of N$_2$O formed of 830 ppmv, which is typical, i.e. average, for an intermediate pressure plant; this corresponds to residual N$_2$O concentrations of <165 ppmv, in particular <80 ppmv, in the process gas or <200 ppmv, in particular <100 ppmv, in the tailgas of HNO$_3$ production. However, degrees of removal of >95% cannot be achieved by means of this technology since the space available for accommodating the secondary catalyst underneath the Pt/Rh gauze catalysts is limited.

However, the secondary measure offers the advantage of universal applicability, usually simple installation and a small catalyst requirement. In the ideal case, only replacement of packing elements which are often arranged underneath the gauze packings for flow equalization by the secondary catalyst is necessary, so that no additional apparatus costs are incurred. Particularly in the case of retrofitting, this is a clear advantage over N$_2$O removal from the tailgas of HNO$_3$ production (known as tertiary measure).

A disadvantage of secondary measures is, however, that owing to the limited space underneath the catalyst gauzes, a correspondingly finely divided catalyst having a high geometric surface area has to be used in order to achieve high degrees of removal of N$_2$O. This is associated with a correspondingly high pressure drop, which is ultimately reflected in a reduced production output of the HNO$_3$ plant. In addition, there is the risk that an only imprecisely definable loss of product can occur since the catalyst can, at 900° C., decompose not only N$_2$O but also NO to an unknown extent.

To remove $NO_x$ from the tailgas of $HNO_3$ production, classical SCR catalysts based on $TiO_2/V_2O_5$ are usually employed in nitric acid plants (cf., for example, G. Ertl, H. Knözinger, J. Weitkamp: Handbook of Heterogeneous Catalysis, vol. 4, pages 1633-1668, VCH Weinheim (1997)). These operate in a temperature range from about 150 to 450° C. and on an industrial scale are preferably operated in the range from 200 to 400° C., in particular from 250 to 350° C. With appropriate dimensioning of the catalyst beds, removal of $NO_x$ down to residual concentrations of 40 ppm of $NO_x$, in special cases down to 20 ppm of $NO_x$, can be achieved in this way. In many nitric acid plants, such SCR catalysts are operated in the tailgas in combination with a secondary measure, i.e. together with $N_2O$ removal in the process gas.

With regard to $NO_x$ removal in the tailgas from $HNO_3$ production, iron-loaded zeolite catalysts also appear to be particularly advantageous since these also enable, unlike classical $deNO_x$ catalysts based on $TiO_2/V_2O_5$, a certain proportion of $N_2O$ to be removed at the same time, depending on the temperature. This is, for example, known from the disclosures in DE 101 12 444 A1 and in DE 102 15 605 A. In DE 101 12 444 A1, a gas containing $N_2O$ and $NO_x$ is firstly mixed with a gaseous reducing agent for $NO_x$, preferably with $NH_3$, and subsequently passed over the catalyst at a space velocity to be selected over the catalyst for the simultaneous removal of $N_2O$ (by decomposition) and $NO_x$ (by reduction) at a temperature of less than 450° C. In DE 102 15 605 A, the gas containing $N_2O$ and $NO_x$ is firstly mixed with ammonia as reducing agent for $NO_x$ and additionally with hydrocarbons or carbon monoxide and/or hydrogen as reducing agent for $N_2O$ and subsequently passed over iron-loaded zeolites for the removal of $N_2O$ and $NO_x$, in each case by reduction, at a temperature of less than 450° C. A prerequisite for effective reduction of the $N_2O$ in this process is complete reduction of $NO_x$. The removal of $N_2O$ in the tailgas from $HNO_3$ production is referred to as tertiary measure.

Various possible ways of avoiding $N_2O$ and $NO_x$ emissions in nitric acid plants have thus been known to those skilled in the art from the prior art. Here, the abovementioned secondary and tertiary measures for removal of $N_2O$ are competing technologies. A combination of these measures for removal of $N_2O$ has hitherto not been realized on an industrial scale for cost reasons. In "Remarks and Comments on Nitric Acid Production Project Protocol—Public Draft Version 1.0 October 2009 (obtainable via http://www.climateactionreserve-.org/wp-content/uploads/2009/06/NAP_Public_Comment_-_Uhde_GmbH.pdf) by Groves and Rieck, it is merely mentioned that a secondary measure having poor removal performance could be supported by a tertiary measure in order then to achieve an overall high degree of removal of $N_2O$. It is not stated how the coupling of these measures should be configured, for example whether the tertiary measure is a catalytic decomposition or reduction of $N_2O$ or whether the removal of $N_2O$ could be coupled with a $deNO_x$ stage or which devices or apparatuses could advantageously be used.

SUMMARY OF INVENTION

The process steps of, firstly, catalytic $N_2O$ removal in the process gas and, secondly, $N_2O$ and $NO_x$ removal in the tailgas with iron-loaded zeolite catalysts are combined with one another for the first time according to the present invention. Since the iron-loaded zeolite catalysts also have, as mentioned above, catalytic activity for $N_2O$ decomposition or $N_2O$ reduction, a further $N_2O$ removal could be achieved in parallel to the $NO_x$ reduction. Since less catalyst is generally required for the removal of $N_2O$ in the process gas at high temperatures (850-950° C.) than for removal of $N_2O$ in the tailgas at low temperatures (T=<500° C.), it first appears to be advantageous from a technical and economic point of view to realize a very high degree of removal of $N_2O$ by means of secondary measures and to use the iron-loaded zeolite catalysts in the tailgas more or less exclusively for the reduction of $NO_x$. It is known that the catalytic reduction of $NO_x$ requires a significantly lower catalyst volume compared to the catalytic removal of $N_2O$. A person skilled in the art would therefore have, proceeding from the suggestions in the prior art, removed the $N_2O$ largely in the process gas downstream of the ammonia oxidation and before introduction into the absorption tower and freed the resulting tailgas, which then would have had predominantly $NO_x$ in terms of the nitrogen oxides, by selective catalytic reduction by means of ammonia in a $deNO_x$ stage based on Fe-zeolite catalysts downstream of the absorption tower.

In the implementation of this concept, it was, however, surprisingly found that the removal power of the $deNO_x$ stage was considerably reduced by the additional installation of a secondary measure. It was surprisingly found that at a very low content of $N_2O$, i.e. when a very high $N_2O$ removal is achieved by the secondary measure, ammonia breakthrough occurs in the offgas stream from the $NO_x$ reduction by means of $NH_3$ in the $deNO_x$ stage downstream of the absorption tower with increasing degrees of reduction of $NO_x$ to values of from <40 to <3 ppmv, depending on the space velocity selected over the catalyst. Since $NH_3$ is a very (eco)toxic compound, this is an extremely undesirable effect. Strict limits are imposed in many countries for $NH_3$ emissions or for $NH_3$ breakthrough from $deNO_x$ plants. In addition, $NH_3$ breakthrough can in the presence of residual $NO_x$ lead to formation of ammonium nitrate which can deposit in cooler parts of the plant. This must be avoided at all costs from a safety point of view since ammonium nitrate is an explosive substance.

It is therefore a feature of the present invention to provide a process and a plant suitable therefor which ensures, by means of a combination of a secondary catalyst in the process gas stream with a $deNO_x$ stage containing an iron-loaded zeolite catalyst in the tailgas stream, both a high degree of removal of $NO_x$ and also of $N_2O$ without ammonia breakthrough in the resulting offgas stream occurring.

The pressure drop generated by the two catalyst stages should lead to no significant impairment of the possible throughput in $HNO_3$ production or to a deterioration in the economics of the process.

In accordance with the invention, there is provided a process for preparing nitric acid by catalytic oxidation of $NH_3$ by means of oxygen and subsequent reaction of the $NO_x$ formed with an absorption medium, preferably with water, in an absorption tower, which comprises a catalyst bed for $N_2O$ decomposition arranged in the process gas, i.e. in the flow direction downstream of the catalytic $NH_3$ oxidation and upstream of the absorption tower, and a catalyst bed for $NO_x$ reduction and effecting a further decrease in the amount of $N_2O$ arranged in the tailgas, i.e. in the flow direction downstream of the absorption tower, wherein the amount of $N_2O$ removed in the catalyst bed for $N_2O$ removal arranged in the process gas is not more than that which results in an $N_2O$ content of >100 ppmv, preferably >200 ppmv, particularly preferably >300 ppmv and very particularly preferably from >300 to 1000 ppmv, and a molar $N_2O/NO_x$ ratio of >0.25, preferably >0.5, before entry of the tailgas into the catalyst bed for $NO_x$ reduction and the catalyst bed for $NO_x$ reduction and effecting a further decrease in the amount of $N_2O$ arranged in the tailgas contains at least one iron-loaded zeolite catalyst and $NH_3$ is added to the tailgas before entry into the catalyst bed in such an amount that an $NO_x$ concentration of <40 ppmv, preferably <20 ppmv, particularly preferably <10 ppmv, very particularly preferably <5 ppmv, in particular <3 ppmv or extremely preferably from <3 to 0 ppmv, results at the outlet from the catalyst bed and the operating parameters are selected in such a way that an $N_2O$ concentration of <200 ppmv, preferably <100 ppmv, particularly preferably <50 ppmv, very particularly preferably <30 ppmv and extremely preferably from <30 to 0 ppmv results.

DETAILED DESCRIPTION

The invention is described in detail below for purposes of illustration, only. The invention is defined in the appended claims. Terminology used throughout the specification and claims herein are given their ordinary meanings, unless otherwise specifically indicated.

The abovementioned removal of $N_2O$ according to the invention in the catalyst bed in the process gas to resulting residual concentrations of >100 ppmv, preferably >200 ppmv, of $N_2O$, particularly preferably >300 ppmv and very particularly preferably from >300 to 1000 ppmv of $N_2O$, refers to the tailgas concentration directly before entry into the catalyst bed for $NO_x$ reduction downstream of the absorption tower.

To achieve such tailgas concentrations before entry into the catalyst bed for $NO_x$ reduction, a reduction of the $N_2O$ content to values of >83 ppmv, preferably >165 ppmv, of $N_2O$, particularly preferably >250 ppmv and very particularly preferably from >250 to 1200 ppmv of $N_2O$, have to be achieved in the upstream catalyst bed arranged in the process gas, as long as no further decrease in the $N_2O$ content is effected by any measures or reaction stages upstream of the catalyst bed for $NO_x$ reduction in the tailgas.

Depending on the actual amount of $N_2O$ formed in the $NH_3$ oxidation, typically amounts in the range from 500 to 2000 ppmv, the $N_2O$ removal according to the invention in the catalyst bed in the process gas is 40-90%, preferably 45-80%, particularly preferably 50-70%, based on the amount of $N_2O$ initially present.

In an advantageous embodiment of the process of the invention, the targeted setting of the $N_2O$ removal in the catalyst bed in the process gas (secondary catalyst) is achieved by variation of the layer thickness or bed height of the catalyst bed and/or selection of the catalyst material and/or selection of the geometry of the catalyst material.

As catalyst materials, it is possible to use, in particular, materials which are known per se for the high-temperature decomposition of $N_2O$.

To be able to work in the long term at the high temperatures required of typically from 800° C. to 1000° C., the catalysts have to have a high thermal stability. For this reason, particularly suitable catalysts are, for example, high-temperature-resistant ceramic catalysts which contain a high-temperature-resistant ceramic material which can itself have catalytic properties and/or serves as support for one or more active components. The catalytically active component can be distributed homogeneously in the ceramic matrix or be present as a layer applied to the surface.

Suitable active components are noble metals, e.g. of the platinum group, and also, in particular, transition metal oxides and/or mixed oxides containing transition metal, preferably those having a perovskite structure, a perovskite-like structure or a spinel structure, as are described, for example, in (N. Gunasekaran et al., Catal. Lett. (1995) 34, (3, 4), pp. 373-382). The use of cobalt-containing oxides or mixed oxides, e.g. $Co_2O_4$ or $LaCoO_3$, is particularly advantageous.

Particular preference is given to using catalysts having a porous support composed of polycrystalline or vitreous inorganic material, a cerium oxide functional layer applied thereto and a layer of oxidic cobalt-containing material applied thereto. Variations thereof are disclosed in DE 10 2007 038 711 A1, which is hereby explicitly incorporated by reference into the disclosure content of the present patent application.

Further suitable catalyst materials are also described, for example, in EP 2 184 105, EP 1 301 275 or DE1984895.

The catalyst materials can be produced as shaped bodies of any size and geometry by shaping methods known in ceramic processing, e.g. dry pressing, granulation or extrusion.

The shape and the size or the equivalent diameter of the shaped bodies is selected so that the desired $N_2O$ removal is achieved at a very low pressure drop over the catalyst bed or packing when using the selected amount of catalyst.

Preferred geometries of the shaped bodies are cylinders, hollow cylinders, multi-hole cylinders, perforated and unperforated trilobes or polylobes or honeycomb structures.

The lower limits to the equivalent diameter of the shaped catalyst bodies is, according to the invention, typically >1.5 mm, preferably >3 mm and in particular >5 mm, and the upper limit to the equivalent diameter is typically <20 mm, preferably <15 mm and in particular <10 mm.

The equivalent diameter of a body or a particle is the diameter of a sphere having the same volume to surface area ratio as the particle. It can be calculated by the formula $$d_e = 6V/A$$

where V=volume of the particle and A=surface area of the particle.

The pressure drop over the bed or packing of the shaped catalyst body is generally <30 mbar, preferably <25 mbar, particularly preferably <20 mbar, very particularly preferably <15 mbar, in particular <10 mbar.

The bed or packing height of the catalyst bed in the process gas (secondary catalyst) is usually 3-30 cm, preferably 5-20 cm, particularly preferably 10-20 cm.

After passage through the secondary catalyst and subsequent cooling, the process gas is fed into the absorption tower of the $HNO_3$ plant. Here, the $NO_x$ formed is reacted with $H_2O$ to form nitric acid and leave a tailgas which, depending on the dimensions of the absorption tower and on the prevailing pressure and temperature at the outlet of the absorption tower, has a residual content of about 200-2000 ppmv of $NO_x$ and an $N_2O$ content of >100 ppmv, preferably >200 ppmv, particularly preferably >300 ppmv and very particularly preferably from >300 to 1000 ppmv.

After stepwise heating of the tailgas, this is then passed through a catalyst bed containing at least one iron-loaded zeolite catalyst to effect $NO_x$ reduction and a further decrease in the content of $N_2O$. Here, $NH_3$ is added to the tailgas for $NO_x$ reduction before entry into the catalyst bed in such an amount that an $NO_x$ concentration of <40 ppmv, preferably <20 ppmv, particularly preferably <10 ppmv, very particularly preferably <5 ppmv, in particular <3 ppmv or extremely particularly preferably from <3 to 0 ppmv, results at the outlet of the catalyst bed.

The other operating parameters such as temperature, pressure and space velocity and/or any addition of specific reducing agents for $N_2O$ are selected so that an $N_2O$ concentration of <200 ppmv, preferably <100 ppmv, very particularly preferably <50 ppmv, in particular <30 ppmv and extremely preferably from <30 to 0 ppmv, results.

The decrease in the content of $N_2O$ in the catalyst bed arranged in the tailgas is typically at least 50%, preferably at least 70%, particularly preferably at least 80% and very particularly preferably from 90 to 100%, based on the content of $N_2O$ at the inlet into this catalyst bed. This degree of removal can be achieved by appropriate setting of the abovementioned operating parameters and/or by addition of specific reducing agents for $N_2O$, preferably hydrocarbons. The measures and also the dimensioning of the catalyst bed in order to achieve this degree of removal are known to those skilled in the art.

For the purposes of the present description, the term space velocity refers to the volume of gas mixture (measured at 0° C. and 1.014 bara) per hour divided by the volume of catalyst. The space velocity can thus be adjusted via the volume flow of the gas and/or via the amount of catalyst.

The tailgas is usually passed through the catalyst bed at a space velocity of from 200 to 200 000 $h^{-1}$, preferably from 5 000 to 100 000 $h^{-1}$, in particular from 5 000 to 50 000 $h^{-1}$. The pressure in the tailgas before entry into the catalyst bed is generally from 1 to 50 bar, preferably at least 2 bar, in particular at least 3 bar, very particularly preferably from 4 to 25 bar. The temperature of the tailgas before entry into the catalyst bed is generally 300-600° C., preferably 330-520° C.

The setting of the abovementioned parameters is known to those skilled in the art, for example from DE 101 12 444 A1 or from DE 102 15 605 A.

In DE 101 12 444 A1, the removal of $N_2O$ is effected over Fe-zeolite catalysts of the Fe-ZSM-5 type by pure decomposition which is catalyzed by residual $NO_x$. For reduction of the $NO_x$, an amount of from 0.9 to 1.3 mol of $NH_3$ for a mol of $NO_x$ to be reduced, in particular from 1.0 to 1.2 mol of $NH_3$ per mol of $NO_x$ to be reduced, is added to the tailgas stream. This addition of $NH_3$ can be applied directly to the process of the invention.

In an embodiment as per DE 102 15 605 A, the $N_2O$ removal is achieved over Fe-zeolite catalysts of the Fe-BEA type by addition of appropriate reducing agents for $N_2O$, preferably hydrocarbons such as methane or propane. The amount of hydrocarbon (HC) required is about 0.2-1 mol of HC/1 mol of $N_2O$ at the inlet into the catalyst bed. Preference is given to amounts of 0.2-0.7 mol of HC/1 mol of $N_2O$, in particular 0.2-0.7 mol of HC/1 mol of $N_2O$. The $NO_x$ content is in this case to be reduced completely, i.e. to values of <10 ppmv, preferably <5 ppmv, in particular <1 ppmv. The addition of appropriate amounts of nitrogen-containing reducing agents is necessary here. In the case of $NH_3$, these are, based on the $NO_x$ entry concentration, about 1-2 mol of $NH_3$/mol of $NO_x$, preferably 1.2-1.8 mol of $NH_3$/mol of $NO_x$, in particular 1.3-1.7 mol of $NH_3$/mol of $NO_x$. In this case, too, the addition of hydrocarbons and $NH_3$ can be applied directly to the process of the invention.

In a particular embodiment of the invention, the catalyst bed for $NO_x$ reduction and effecting a further decrease in the amount of $N_2O$ arranged in the tailgas is divided into a plurality of reaction zones or physically separate reaction stages. A gradated introduction of $NH_3$ into the individual reaction zones or into the physically separate reaction zones of the catalyst bed arranged in the tailgas is preferably carried out.

The way in which the reducing agents are introduced into the gas stream to be treated can be chosen freely for the purposes of the invention, as long as the reducing agent is fed in upstream of the catalyst bed. The introduction can, for example, be effected into the entry line upstream of the vessel or directly upstream of the catalyst bed. The reducing agent can be introduced in the form of a gas or else a liquid or aqueous solution which vaporizes in the gas stream to be treated. The introduction is carried out by means of a suitable device such as an appropriate pressure valve or appropriately configured nozzles which open into a mixer for the gas stream to be purified and the reducing agent introduced. When different reducing agents are used for $NO_x$ and $N_2O$, they can be fed and introduced into the gas to be purified either separately or together.

As catalysts, use is made of iron-loaded zeolite catalysts which, based on the mass of zeolite, contain up to 25% of iron, but preferably from 0.1 to 10%.

Iron-loaded zeolite catalysts which are particularly preferably used according to the invention essentially contain >50% by weight, in particular >70% by weight, of one or more iron-loaded zeolites. Thus, for example, it is possible for not only an Fe-ZSM-5 zeolite but also a further iron-containing zeolite, e.g. an iron-containing zeolite of the FER type, to be present in the catalyst used according to the invention.

In addition, the catalyst used according to the invention can contain further additives known to those skilled in the art, e.g. binders.

Catalysts used according to the invention are very particularly preferably based on zeolites into which iron has been introduced by means of solid-state iron exchange. For this purpose, the commercially available ammonium zeolites (e.g. $NH_4$-ZSM-5) and the appropriate iron salts (e.g. $FeSO_4 \times 7\ H_2O$) are usually used as starting materials and these are mixed intensively with one another by mechanical means in a bore mill at room temperature (Turek et al.; Appl. Catal. 184, (1999) 249-256; EP-A-0 955 080). The catalyst powders obtained in this way are subsequently calcined in air at temperatures in the range from 400 to 600° C. in a box furnace. After calcination, the iron-containing zeolites are intensively washed in distilled water and, after filtering off the zeolite, dried. The iron-containing zeolites obtained in this way are subsequently admixed with suitable binders and mixed and, for example, extruded to form cylindrical catalyst bodies. Suitable binders are all binders customarily used; the most widely used binders here are aluminum silicates such as kaolin. It is naturally also possible to use iron-loaded zeolites produced by ion exchange in the liquid phase, for example those produced from the H form and/or the $NH_4$ form of the zeolites by exchange with an aqueous solution of iron salts.

Preference is given to using iron-loaded zeolite catalysts in which the zeolite is selected from the group consisting of the types MFI, BEA, FER, MOR, FAU and/or MEL and very particularly preferably from the group consisting of the types MFI and BEA and FER.

If the further $N_2O$ removal in the catalyst bed in the tailgas is effected by decomposition into $N_2$ and $O_2$, very particular preference is given to using iron-loaded zeolites of the MFI and/or BEA and/or FER type, in particular an iron-loaded ZSM-5 zeolite.

If the further $N_2O$ removal in the catalyst bed in the tailgas is effected by reduction of the $N_2O$ by means of hydrocarbons, very particular preference is given to using iron-loaded zeolites of the MFI, BEA, FER, MOR, FAU and/or MEL type, in particular iron-loaded zeolites of the MFI and/or BEA type.

In the process of the invention or in the apparatus of the invention, the use of zeolites in which the lattice aluminum has been partly isomorphously replaced by one or more elements, for example replaced by one or more elements selected from among B, Be, Ga, Fe, Cr, V, As, Sb and Bi, is also included in the catalyst bed in the tailgas. The use of zeolites in which the lattice silicon has been isomorphously replaced by one or more elements, for example replaced by one or more elements selected from among Ge, Ti, Zr and Hf, is likewise included.

Precise information on the make-up or structure of the zeolites which are preferably used according to the invention is given in the Atlas of Zeolite Structure Types, Elsevier, $4^{th}$ revised Edition 1996, which is hereby expressly incorporated by reference.

Very particular preference is given to using the above-defined zeolite catalysts which have been treated with steam ("steamed" catalysts) in the process of the invention or in the apparatus of the invention. The lattice of the zeolites is dealuminated by such a treatment; this treatment is known per se to those skilled in the art. These hydrothermally treated zeolite catalysts surprisingly display a particularly high activity in the process of the invention.

Preference is given to hydrothermally treated zeolite catalysts which have been loaded with iron and in which the ratio of extra-lattice aluminum to lattice aluminum is at least 1:2, preferably from 1:2 to 20:1.

The catalyst bed in the tailgas can be configured freely for the purposes of the invention. Thus, for example, the catalyst or catalysts can be arranged in a catalyst bed through which the gas flows axially or laterally, preferably radially, and which is arranged in one or more vessels.

In a further embodiment of the invention, one or more further stages for removal of $N_2O$ and/or $NO_x$ is/are arranged between the catalyst bed for $N_2O$ decomposition arranged in the process gas and the catalyst bed for $NO_x$ reduction and effecting a further decrease in $N_2O$ arranged in the tailgas. In these stages, processes known per se for decreasing the amount of $N_2O$ and $NO_x$ are used. This can preferably be effected catalytically.

The invention also provides a nitric acid plant in which a catalytic removal of the $N_2O$ formed in the catalytic $NH_3$ oxidation is carried out in the process gas and a further reduction of the $N_2O$ content and a reduction of the $NO_x$ content is carried out in the tailgas downstream of the absorption tower.

The plant comprises at least the following elements:

A) reactor for the catalytic oxidation of $NH_3$ by means of oxygen to produce an $NO_x$-containing process gas, B) absorption tower for reacting the $NO_x$ formed from the process gas with an absorption medium, preferably water, leaving a tail gas containing $NO_x$ and $N_2O$, C) at least one first catalyst bed for $N_2O$ decomposition through which the process gas flows and which is arranged downstream of the catalytic $NH_3$ oxidation and upstream of the absorption tower, D) at least one second catalyst bed for $NO_x$ reduction and effecting a further decrease in the $N_2O$ content, through which the tailgas flows and which is arranged downstream of the absorption tower, and E) at least one device for feeding gaseous reducing agent into the tailgas, which is arranged downstream of the absorption tower and upstream of the second catalyst bed, where F) the first catalyst bed contains a catalyst suitable for the decomposition of $N_2O$, preferably a catalyst which contains transition metal oxides and/or transition metal-containing mixed oxides, preferably mixed oxides having a perovskite structure, a perovskite-like structure or a spinel structure, and/or noble metals as active component and G) the second catalyst bed contains a catalyst containing iron-loaded zeolites.

Further preferred embodiments of the apparatus of the invention are enumerated in the dependent claims.

Examples 1, 3 and 5 and also comparative examples 2, 4 and 6 below illustrate the invention without restricting it.

Examples 1, 3 and 5 and also comparative examples 2, 4 and 6 demonstrate the effect of the $N_2O$ entry concentration on the achievable $NO_x$ removal for the example of a $deNO_x$ stage which contains an iron-loaded zeolite catalyst. The $N_2O$ entry concentration selected in examples 1, 3 and 5 corresponds to an $N_2O$ content which results from operation according to the invention of the catalyst stage in the process gas stream. The $N_2O$ inlet concentration in the comparative examples 2, 4 and 6 gives a comparison with operation which is not according to the invention of the catalyst stage in the process gas stream.

The catalysts used in experiments 1 to 6 were iron-loaded zeolites of the ZSM-5 type (examples 1 to 4) or iron-loaded zeolites of the BEA type (examples 5 and 6) which had been produced by solid-state ion exchange starting out from ZSM-5 or BEA zeolite powder in the ammonium form.

Detailed information on the preparation may be found in M. Rauscher, K. Kesore, R. Mönning, W. Schwieger, A. Tißler, T. Turek: "Preparation of highly active Fe-ZSM-5 catalyst through solid state ion exchange for the catalytic decomposition of $N_2O$" in Appl. Catal. 184 (1999) 249-256. The catalyst powder obtained was calcined in air at 823 k for six hours, washed and dried overnight at 383 K. After addition of an appropriate binder, the powder was extruded to give cylindrical catalyst bodies.

At a nominal degree of exchange of 100% and a modulus ($SiO_2/Al_2O_3$ ratio) of in each case about 25, the iron content of the catalyst samples before shaping was in each case about 5%.

To carry out the experiments for examples 1 to 6, the extrudates obtained were crushed and a particle size fraction of 0.5-1.25 mm was sieved out. Of this, 1.75 g (of the catalyst Fe-ZSM-5) or 1.50 g (of the catalyst Fe-BEA) were then in each case diluted to a bed volume of 12 ml with glass beads and introduced into a suitable flow tube reactor.

The operating temperature in the reactor tube was set by means of electric heating. The analysis of the gas streams entering and leaving the reactor was carried out by means of an FTIR spectrometer (model 5700, from Thermo) which was equipped with a heated 2 m long-path gas cell.

The precise experimental and operating conditions of the individual experiments are shown in Table 1 below.

TABLE 1

Operating conditions for experiments 1 to 6

| Experiment | | | 1 | 2 | 3 | 4 | 5 | 6 |
|---|---|---|---|---|---|---|---|---|
| Process parameters | T | °C. | 440 | 440 | 420 | 420 | 400 | 400 |
| | SV*) | h$^{-1}$ | 60 000 | 60 000 | 40 000 | 40 000 | 50 000 | 50 000 |
| | P | bara | 4.0 | 4.0 | 4.0 | 4.0 | 4.0 | 4.0 |
| Gas composition on entry into the experiment reactor | NOx | ppmv | 1001 | 1012 | 1007 | 1000 | 510 | 502 |
| | $N_2O$ | ppmv | 549 | 83 | 571 | 92 | 501 | 98 |
| | $H_2O$ | % by vol. | ~0.31 | ~0.31 | ~0.31 | ~0.31 | ~0.32 | ~0.32 |
| | $O_2$ | % by vol. | 1.0 | 1.0 | 1.0 | 1.0 | 1.0 | 1.0 |
| | $N_2O/NO_x$ | mol/mol | 0.55 | 0.08 | 0.57 | 0.09 | 0.98 | 0.20 |
| | $NH_3$ | ppmv | 1138 | 1088 | 1306 | 1175 | 664 | 548 |

*)SV = space velocity

The results of experiments 1 to 6 are shown in Table 2.

TABLE 2

Experimental results

| Experiment | | | 1 | 2 | 3 | 4 | 5 | 6 |
|---|---|---|---|---|---|---|---|---|
| Gas composition at the outlet of the experimental reactor | $NO_x$ | ppmv | 32 | 81 | 8 | 27 | 1 | 16 |
| | $N_2O$ | ppmv | 107 | 11 | 111 | 11 | 210 | 27 |
| Degree of removal at the outlet of the experimental reactor | $NO_x$ | % | 96.8 | 80.0 | 99.2 | 97.3 | 99.8 | 96.8 |
| | $N_2O$ | % | 80.5 | 86.7 | 80.6 | 88.0 | 58.1 | 72.4 |

*)SV = space velocity $NH_3$ as reducing agent for $NO_x$ is added in an amount corresponding to the maximum amount which can be added until analytically significant $NH_3$ breakthrough (about 1-2 ppmv) occurs; i.e. the indicated residual concentration of $NO_x$ corresponds to the minimum possible residual concentration of $NO_x$, and the degree of removal of $NO_x$ corresponds to the maximum degree of removal which can still just be achieved by addition of $NH_3$ without $NH_3$ breakthrough occurring.

As can be seen from Tables 1 and 2, a very much higher $NO_x$ removal can in each case be achieved in the case of a high $N_2O$ entry concentration (experiments 1, 3 and 5) than under otherwise identical conditions in the case of a reduced $N_2O$ entry concentration, as in examples 2, 4 and 6. Thus, the residual $NO_x$ concentration can be decreased from 81 ppmv to 32 ppmv in experiment 1 according to the invention compared to comparative experiment 2. In experiment 3 according to the invention, the residual $NO_x$ concentration can be reduced from 27 to 8 compared to comparative experiment 4.

Finally, more or less complete $NO_x$ reduction can be achieved in experiment 5 compared to experiment 6. This is of particular significance, since, as mentioned at the outset, in the case of complete $NO_x$ reduction, a further $N_2O$ reduction can be achieved by addition of hydrocarbons, preferably by means of methane, according to the process described in DE 102 15 605 A.

Overall, it can be seen from the above examples that in the case of an excessive reduction of the $N_2O$ content in the upstream catalyst bed in the process gas, as is usually sought and realized, the deNO$_x$ performance of the downstream catalyst bed through which the tailgas flows is significantly reduced and the desired degree of removal of $NO_x$ can sometimes no longer be achieved.

Without knowledge of this wholly unexpected relationship, a person skilled in the art would have only the possibility of appropriately adapting the design of the downstream catalyst bed through which the tailgas flows, i.e. at given process parameters (pressure, temperature, volume flow), appropriately increasing the size of the reactor or the catalyst volume of this catalyst bed. However, it is much more convenient to adapt the removal performance of the catalyst stage for $N_2O$ decomposition in the process gas according to the invention so that a residual concentration of $N_2O$ of >100 ppmv, preferably >200 ppmv and particularly preferably >300 ppmv, and a molar $N_2O/NO_x$ ratio of >0.25, preferably >0.5, result before entry into the catalyst bed.

The decreased degree of removal of $N_2O$ is compensated for in the downstream catalyst bed through which the tailgas flows, i.e. through the catalyst bed charged with Fe-zeolite catalyst in the tailgas, which, according to the invention also brings about $N_2O$ removal in parallel to the $NO_x$ reduction. In experiments 1 to 4, in which the $N_2O$ removal is effected by decomposition into $N_2$ and $O_2$, this is only slightly dependent on the $N_2O$ entry concentration and under the process conditions (pressure, temperature, space velocity) selected is in the range from 80 to 90%.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

We claim:

1. A nitric acid plant in which a catalytic removal of $N_2O$ formed in a catalytic $NH_3$ oxidation is carried out in an $NO_x$-containing process gas and a further reduction of the $N_2O$ content and a reduction of a $NO_x$ content is carried out in a tailgas downstream of an absorption tower, which comprises at least the following elements:
    A) a reactor for the catalytic oxidation of $NH_3$ by means of oxygen to produce the $NO_x$-containing process gas,
    B) at least one first catalyst bed for $N_2O$ decomposition through which the $NO_x$-containing process gas flows and which is arranged directly downstream from the catalytic $NH_3$ oxidation, in the flow direction, where the $NO_x$-containing process gas has a temperature of 850-950° C., C) the absorption tower, arranged downstream from the at least one first catalyst bed, for reacting the $NO_x$ formed from the $NO_x$-containing process gas with an absorption medium, leaving the tailgas containing $NO_x$ and $N_2O$, D) at least one device for feeding gaseous reducing agent into the tailgas leaving the absorption tower in the flow direction, E) at least one second catalyst bed for $NO_x$ reduction and effecting a further decrease in the $N_2O$ content, through which the tailgas flows and which is arranged downstream of the device for feeding gaseous reducing agent into the tailgas in the flow direction, and wherein F) the first catalyst bed (i) contains a catalyst suitable for the decomposition of $N_2O$ and (ii) is configured such that the $NO_x$-containing process gas exiting the first catalyst bed exhibits a $N_2O$ content of >100 ppmv and a molar $N_2O/NO_x$ ratio of >0.25, and G) the second catalyst bed contains a catalyst containing at least one iron-loaded zeolite.

2. The nitric acid plant as claimed in claim 1, wherein the absorption medium is water.

3. The nitric acid plant as claimed in claim 1, wherein the catalyst material of the first catalyst bed contains transition metal oxides and/or transition metal-containing mixed oxides and/or noble metals as active components.

4. The nitric acid plant as claimed in claim 1, wherein the catalyst material of the first catalyst bed contains transition metal mixed oxides having a perovskite structure, a perovskite-like structure, or a spinel structure.

5. The nitric acid plant as claimed in claim 1, wherein the catalyst material of the first catalyst bed contains cobalt-containing oxides or mixed oxides as active components.

6. The nitric acid plant as claimed in claim 5, wherein the catalyst material of the first catalyst bed comprises a porous support composed of polycrystalline or vitreous inorganic material, a cerium oxide functional layer applied thereto, and a layer of oxidic cobalt-containing material applied thereto.

7. The nitric acid plant as claimed in claim 1, wherein the bed height of the catalyst material of the first catalyst bed is 3-30 cm.

8. The nitric acid plant as claimed in claim 7, wherein the bed height of the catalyst material of the first catalyst bed is 5-20 cm.

9. The nitric acid plant as claimed in claim 7, wherein the bed height of the catalyst material of the first catalyst bed is 10-20 cm.

10. The nitric acid plant as claimed in claim 1, wherein the iron-loaded zeolite catalyst in the second catalyst bed is a zeolite of the MFI, BEA, FER, MOR, FAU and/or MEL type.

11. The nitric acid plant as claimed in claim 10, wherein the iron-loaded zeolite catalyst in the second catalyst bed is of the MFI and/or BEA and/or FER type.

* * * * *